United States Patent [19]

Duncan

[11] 4,379,587
[45] Apr. 12, 1983

[54] SEAT STRUCTURE

[76] Inventor: Leo D. Duncan, R.R. #2, Webster, Wis. 54893

[21] Appl. No.: 236,643

[22] Filed: Feb. 23, 1981

[51] Int. Cl.³ .................................................. A47C 9/00
[52] U.S. Cl. .................................... 297/192; 297/217; 297/193; 297/130
[58] Field of Search ............... 297/217, 193, 192, 461, 297/462, 239, 134, 130; 108/101, 91, 159, 11, 14

[56] References Cited

U.S. PATENT DOCUMENTS

| | | | |
|---|---|---|---|
| 405,496 | 6/1889 | McCord | 297/192 |
| 1,336,973 | 4/1920 | Levene | 108/91 X |
| 2,265,841 | 12/1941 | Jankowski | 155/134 |
| 2,551,766 | 5/1951 | Service | 297/193 X |
| 2,919,169 | 12/1959 | Jackson | 297/461 |
| 2,945,597 | 7/1960 | Romano | 108/101 X |
| 2,989,115 | 6/1961 | Egles | 297/217 |
| 3,099,482 | 7/1963 | Woodruff | 297/193 |
| 3,128,137 | 4/1964 | Dokter | 312/235 |
| 3,230,006 | 1/1966 | Sokolis | 297/193 |
| 3,368,856 | 2/1968 | Tisdall et al. | 108/91 X |
| 3,606,949 | 9/1971 | Joyce | 108/91 X |
| 3,609,639 | 9/1971 | Wilson | 297/219 |
| 3,695,742 | 10/1972 | Allen | 312/237 |
| 3,744,842 | 7/1973 | Ronning | 297/180 |
| 3,751,845 | 8/1973 | van Leeuwen | 297/193 X |
| 3,797,695 | 3/1974 | Law | 220/85 R |
| 4,106,811 | 8/1978 | Hernandez | 297/193 |

Primary Examiner—Francis K. Zugel
Attorney, Agent, or Firm—Leo Gregory

[57] ABSTRACT

A seat structure particularly for use as in an ice fishing house, the seat structure being constructed to be elevated to a convenient seating height by being positioned upon and supported by a fishing bucket and permitting free access to the bucket, the improvement consisting of leg members having notched bottom end portions arranged to receive therein and be supported upon the upper open rim portion of a fishing pail or bucket, the leg members depending from a rigid seat member and the seat member being formed to include an overlying layer of weather resistant insulating material.

1 Claim, 3 Drawing Figures

SEAT STRUCTURE

BACKGROUND OF THE INVENTION

1. Field of Invention

This invention relates to an insulated supportable seat structure.

2. Description of the Previous Art

Auxiliary containers or supports for seat structures are known such as the nesting seat structures as shown in U.S. Pat. Nos. 2,265,841 and 3,695,742. In U.S. Pat. No. 4,106,811, clamping means are shown securing a seat to a bucket. In U.S. Pat. No. 3,128,137, a combination folding camp stool and tackle box is shown and in U.S. Pat. No. 2,919,169, a bucket is shown having a padded lid for seating purposes.

SUMMARY OF THE INVENTION

The invention herein relates particularly to a stool or seat structure which is convenient for use as in an ice fishing house, wherein there is limited space and the seat structure itself does not require any floor space but is supported upon a fishing bucket which is required to be within the ice house and in being supported thereon, said seat structure allows free access to said bucket.

The seat structure herein as described is of a convenient size for use and for handling and is supported at a convenient seating height as by a fishing pail or bucket, the seat structure does not restrict the use of said bucket for its otherwise purposes.

It is desirable to have an object of this invention to provide a seat structure which may be supported upon a fishing bucket or pail in a stable seating condition and which comprises a seat of a weather proof type of insulating material wherein the heat of the body is not unduly dissipated but is sufficiently retained to cause the seat to become comfortably warm.

It is another object of this invention to provide a seat structure of less than ordinary adult seating height whereby it is convenient to handle and which has spaced depending leg portions having notched bottoms particularly adapted to receive therein the upper open rim portion of a fishing pail or bucket whereby said bucket supports said seat structure at a convenient seating height.

It is a further object herein in view of the preceeding object to have said leg portions depend from a rigid seat member which is formed with an overlying layer of weather resistant insulating material.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
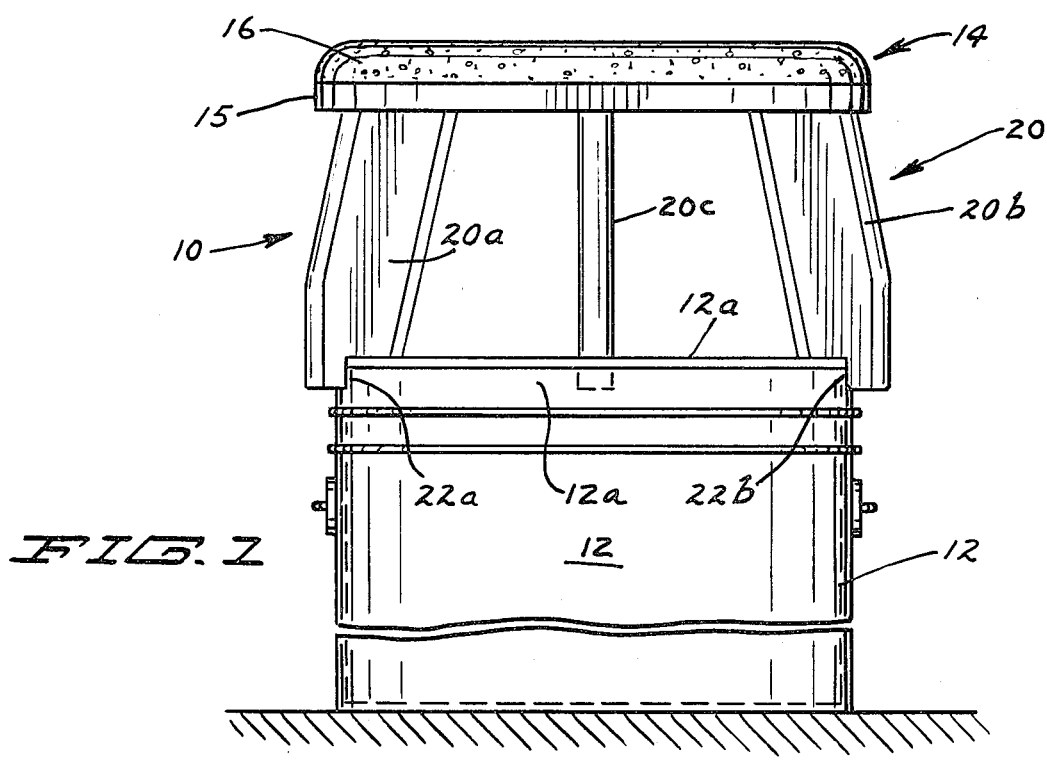
FIG. 1 is a view in elevation in operating position with a portion of the supporting member being broken away.

Referring to the drawings in FIG. 1, the seat structure 10 herein is shown supported upon a fishing pail or bucket 12 which positions said seating structure at a convenient and comfortable seating height. Said seat structure would be thus positioned as for use in an ice fishing house.

The seat member 14 of said seat structure is shown to be circular in form having a rigid base or plate member 15 formed as of particle board material which is treated to be weather resistant and overlying said plate member 15 and being suitably secured thereto as to be integral therewith is an upper outer layer 16 of said seat member 14 formed of an insulating material and preferably a homogeneous material such as of a rigid styrofoam. Said insulating layer 16 inhibits the dissipation of body heat and thus the seat member attains and retains a comfortable seating temperature in use.

Figure 2:
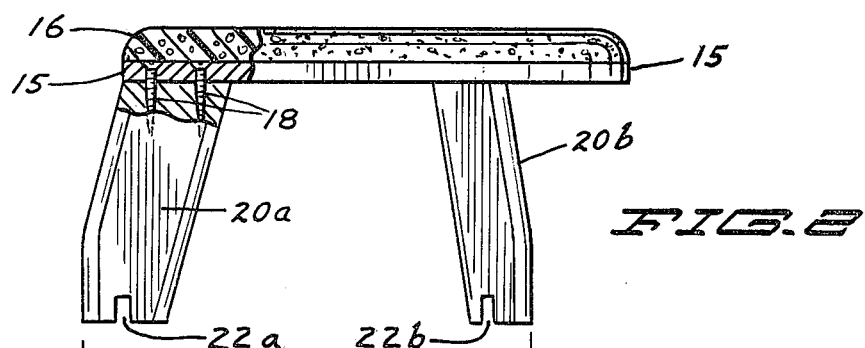
FIG. 2 is a view in elevation with a portion of the structure broken away to show a detail.
Figure 3:
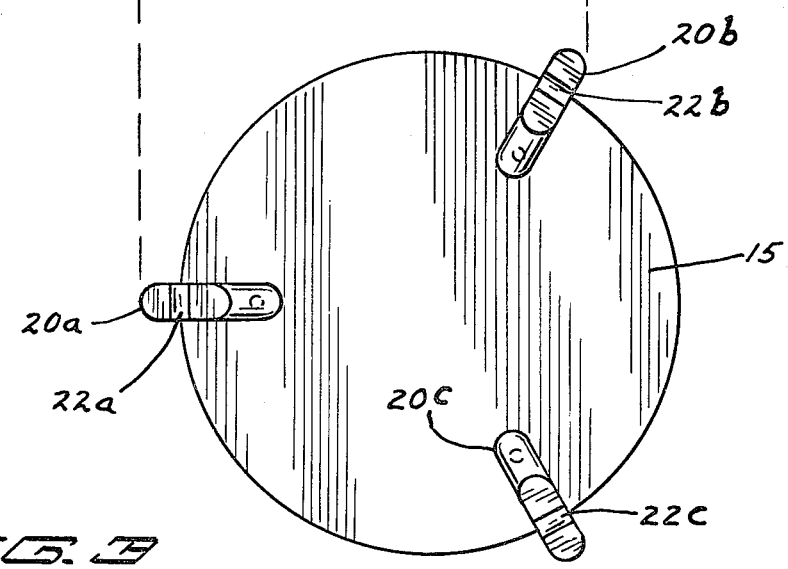
FIG. 3 is a bottom plan view.

Depending from said plate member 15 radially spaced thereabout and being suitably secured thereto as by screws 18 through said plate member as shown in FIG. 2, are leg members 20 here shown to be three in number forming a tripod support.

Said leg members individually indicated as being 20A-C will be made of a suitable material such as of wood and are of a relatively short height and are of such a height as to position the seat 10 at a comfortable seating height as for an adult when supported by a fishing bucket.

The bottom portions of said leg members as shown at 22a and 22b have open ended notches therein with said leg members being spaced radially about said plate member as to conveniently receive the upper open rim 12a of said pail 12 within said notches. Said notches will be of sufficient depth to provide a stable support. The seat structure 14 is sufficiently raised above the rim of said bucket to provide ready access into said bucket between said legs 20A-C for whatever purpose may be desired.

The seat structure as described and shown is compact and relatively small and is convenient to handle and in lieu of occupying other or additional floor space as in a fish house, it is very conveniently mounted upon a fishing pail or bucket otherwise required to be within the fish house. Thus a convenient and comfortable seat structure is provided with said seat structure merely forming a vertical extension of said bucket.

The seat structure herein has proved to be very convenient and comfortable in use and has also shown itself to be successful as a popular item of purchase in the market place.

It will of course be understood that various changes may be made in form, details, arrangement and proportions of the parts without departing from the scope of the invention herein which, generally stated, consists in an apparatus capable of carrying out the objects above set forth, in the parts and combinations of parts disclosed and defined in the appended claims.

What is claimed is:

1. A seat structure for fishing purposes particularly adapted to be elevated upon an upstanding receptacle, having in combination
    a rigid seat plate member,
    a plurality of spaced leg members depending from said plate member,
    said leg members having open ended notches at their bottom end portions,
    a cylindrical upstanding receptacle forming a bucket member having an upper rim portion,
    said leg members being spaced to have their respective notches seat upon said rim portion, and
    said leg members being of such height as to elevate said plate member in such spaced relation to said rim portion to provide free reaching access into said bucket.

* * * * *